US005112514A

United States Patent [19]

Bolkan et al.

[11] Patent Number: 5,112,514

[45] Date of Patent: * May 12, 1992

[54] OXIDANT DETERGENT CONTAINING STABLE BLEACH ACTIVATOR GRANULES

[75] Inventors: Steven A. Bolkan, Pleasanton; Kelly J. Brodbeck, Danville; Kevin J. Brodbeck, Pleasanton; David L. Deleeuw, San Ramon; Dale S. Steichen, Byron; Bruce B. Strand, Pleasanton; Richard J. V. Suk, Newark; Kathleen D. Szuch, Walnut Creek; Alfred G. Zielske, Pleasanton, all of Calif.

[73] Assignee: The Clorox Company, Oakland, Calif.

[ * ] Notice: The portion of the term of this patent subsequent to Oct. 18, 2005 has been disclaimed.

[21] Appl. No.: 675,240

[22] Filed: Mar. 25, 1991

Related U.S. Application Data

[60] Division of Ser. No. 258,225, Oct. 14, 1988, Pat. No. 5,002,691, and a continuation-in-part of Ser. No. 928,070, Nov. 6, 1986, Pat. No. 4,778,618.

[51] Int. Cl.[5] ........................ C11D 7/38; C01B 15/00; C09K 3/00

[52] U.S. Cl. ................................ 252/99; 252/186.25; 252/186.27; 252/186.30; 252/186.39; 252/95

[58] Field of Search ...................... 252/186.25, 186.27, 252/186.30, 186.31, 186.38, 186.39

[56] References Cited

U.S. PATENT DOCUMENTS

| | | | |
|---|---|---|---|
| 3,661,789 | 5/1972 | Corey et al. | 252/186 |
| 3,671,439 | 6/1972 | Corey et al. | 252/99 |
| 3,726,967 | 4/1973 | Vorsatz et al. | 424/62 |
| 3,769,224 | 10/1973 | Inamorato | 252/99 |
| 3,779,931 | 12/1973 | Fries et al. | 252/99 |
| 3,789,002 | 1/1974 | Weber et al. | 252/99 |
| 3,833,506 | 9/1974 | Fries et al. | 252/99 |
| 3,960,743 | 6/1976 | Nakagawa et al. | 252/99 |
| 3,982,892 | 9/1976 | Gray et al. | 8/111 |
| 4,009,113 | 2/1977 | Green et al. | 252/95 |
| 4,059,538 | 11/1977 | Green et al. | 252/95 |

(List continued on next page.)

| | | | |
|---|---|---|---|
| 4,087,369 | 5/1978 | Wevers | 252/102 |

FOREIGN PATENT DOCUMENTS

| | | |
|---|---|---|
| 106634 | 4/1984 | European Pat. Off. . |
| 137669 | 4/1985 | European Pat. Off. . |
| 238341 | 9/1987 | European Pat. Off. . |
| 241962 | 10/1987 | European Pat. Off. . |
| 283252 | 9/1988 | European Pat. Off. . |
| 1147871 | 4/1969 | United Kingdom . |
| 864798 | 4/1984 | United Kingdom . |
| 2175621 | 12/1986 | United Kingdom . |
| 2178075 | 2/1987 | United Kingdom . |

*Primary Examiner*—Robert L. Stoll
*Assistant Examiner*—Joseph D. Anthony
*Attorney, Agent, or Firm*—Joel J. Hayashida; Michael J. Mazza; Harry A. Pacini

[57] ABSTRACT

The present invention provides stable bleach activator granules comprising:

a) a peroxygen bleach activator having the structure:

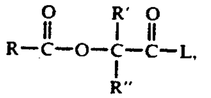

wherein R is $C_{1-20}$ branched or straight chain alkyl, alkoxylated alkyl, cycloalkyl, alkenyl, aryl, substituted aryl, alkylaryl; R′ and R″ are independently H, $C_{1-4}$ alkyl, aryl; and L is a leaving group;

b) a pliable binding material selected from materials having a melting completion temperature of greater than about 40° C.; and, optionally, c) a filler material.

These bleach activator granules are combined with a detergent base which contains an oxidant bleach to provide an activated oxidant detergent composition.

9 Claims, 1 Drawing Sheet

U.S. PATENT DOCUMENTS 4,111,826 9/1978 Leigh et al. .......................... 251/89 R
4,145,183 3/1979 Bostwick .......................... 8/111
4,221,675 9/1980 Schirmann et al. .......................... 252/186
4,283,302 8/1981 Foret et al. .......................... 252/102
4,290,903 9/1981 MacGilp et al. .......................... 252/91
4,321,157 3/1982 Harris et al. .......................... 252/174.25
4,325,828 4/1982 Postlethwaite .......................... 252/102
4,333,844 6/1982 Duggleby et al. .......................... 252/97
4,372,868 2/1983 Saran .......................... 252/102
4,399,049 8/1983 Gray et al. .......................... 252/91
4,412,934 11/1983 Chung et al. .......................... 252/186.38
4,422,950 12/1982 Kemper .......................... 252/186.38
4,444,674 2/1984 Gray .......................... 252/95
4,450,089 5/1984 Broze et al. .......................... 252/95
4,457,858 7/1984 Saran et al. .......................... 252/182
4,483,778 11/1984 Thompson et al. .......................... 252/94
4,486,327 12/1984 Murphy et al. .......................... 252/94
4,490,271 12/1984 Spadini et al. .......................... 252/174.23
4,536,314 8/1985 Hardy et al. .......................... 252/102
4,539,130 9/1985 Thompson et al. .......................... 252/186.38
4,539,131 9/1985 Garner-Gray .......................... 252/99
4,568,476 2/1986 Kielman et al. .......................... 252/95
4,578,206 3/1986 Walker .......................... 252/95
4,591,450 5/1986 Nistri et al. .......................... 252/135
4,634,551 1/1987 Burns et al. .......................... 252/102
4,637,894 1/1987 Smidrkal et al. .......................... 252/186.4
4,639,326 1/1987 Czempik et al. .......................... 252/91
4,642,197 2/1987 Kruse et al. .......................... 252/98
4,671,891 6/1987 Hartman .......................... 252/186.42
4,678,594 7/1987 Parfomak et al. .......................... 252/186.31
4,681,592 7/1987 Hardy et al. .......................... 8/111
4,681,695 7/1987 Divo .......................... 252/94
4,695,397 9/1987 Sommer et al. .......................... 252/182
4,711,748 12/1987 Irwin et al. .......................... 264/117
4,713,079 12/1987 Chun et al. .......................... 8/101
4,726,908 2/1988 Kruse et al. .......................... 252/91
4,731,196 3/1988 Staton et al. .......................... 252/184
4,762,636 8/1988 Balliello et al. .......................... 252/95
4,770,666 9/1988 Clauss .......................... 8/111
4,772,290 9/1988 Mitchell et al. .......................... 8/107
4,778,618 10/1988 Fong et al. .......................... 252/186.38
5,002,691 3/1991 Bolkan et al. .......................... 252/186.25

OXIDANT DETERGENT CONTAINING STABLE BLEACH ACTIVATOR GRANULES

Reference to related applications: This is division of U.S. Ser. No. 07/258,225, filed Oct. 14, 8 now 5,002, and a a continuation-in-part of U.S. patent application Ser. No. 06/928,070, filed Nov. 6, 1986, now U.S. Pat. No. 4,778,618 by inventors Ronald A. Fong, et al., entitled "GLYCOLATE ESTER PERACID PRECURSORS," the disclosure of which is incorporated herein by reference thereto.

BACKGROUND OF THE INVENTION

1. Field of the Invention

This invention relates to stable bleach activator granules, specifically, granules which contain activators with the structure:

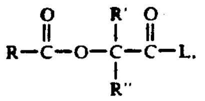

wherein R is $C_{1-20}$ branched or straight chain alkyl, alkoxylated alkyl, cycloalkyl, substituted aryl, alkenyl, aryl, alkylaryl; R' and R" are independently H, $C_{1-4}$ alkyl, aryl; and L is a leaving group.

These activator granules are combined with a detergent base which comprises builders; and a surfactant selected from the group consisting of anionic, nonionic, cationic, amphoteric, zwitterionic surfactants, and mixtures thereof; and a bleach-effective amount of a source of hydrogen peroxide to act with the activator granules.

2. Brief Description of the Prior Art

Bleach activators have been widely described in the literature. For example, Boldingh et al., U.K. 1,147,871, describes bleaching and detergent compositions containing an inorganic persalt and acyloxyalkyl or acyl benzene sulfonates. It is claimed that such esters provide improved bleaching temperatures below 70° C. when compared to compositions using the persalt alone. These activators are represented by the formula:

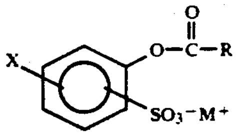

wherein X = branched or straight chain alkyl or acyl radical containing 6–17 carbon atoms; R = H or alkyl radical having 1–7 carbon atoms; and M = an alkali metal, or ammonium radical.

Chung et al., U.S. Pat. No. 4,412,934, discloses bleaching compositions containing a peroxygen bleaching compound and a bleach activator of the general formula

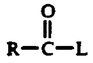

wherein R is an alkyl group containing from about 5 to about 18 carbon atoms; L is a leaving group, the conjugate acid of which has a $pK_a$ in the range of about 6 to about 13. Chung et al. focuses on alkanoyloxy benzene sulfonates, which have been previously disclosed in G.B. 864,798, Hampson et al.

Thompson et al, U.S. Pat. No. 4,483,778, discloses bleach activators of the structure

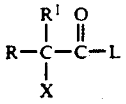

wherein R is $C_{4-14}$ alkyl, $R^1$ is H or $C_{1-3}$ alkyl, X is -Cl, $-OCH_3$, or $-OCH_2CH_3$, and L is a leaving group whose conjugate acid has a $pK_a$ of 4-30. The apparently crowded alpha carbon in the Thompson et al. compound may present hindered perhydrolytic reactivity.

Hardy et al., U.S. Pat. No. 4,681,952, discloses the use of a bleach activator compound of the formula $[RX]_mAL$, wherein R is hydrocarbyl, $C_{6-20}$ alkyl substituted aryl, or alkoxylated hydrocarbyl; X is O, $SO_2$, $N(R^1)_2$,$(R^1)P$-- O or $(R^1)N$--O, wherein for m=1, A includes

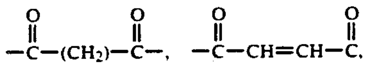

or

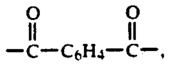

and L can be oxybenzene sulfonate.

Burns et al., U.S. Pat. No. 4,634,551, discloses the use of amide esters of the formula

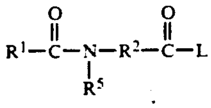

or

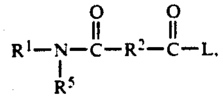

wherein $R^1$ and $R^2$ are alkyl(ene) aryl(ene) or alkylaryl(ene) with 1-14 carbon atoms and $R^5$ is H, an alkyl, aryl, or alkylaryl group with 1-10 carbon atoms.

Nakagawa et al., U.S. Pat. No. 3,960,743, disclose polymeric activators having the general structure

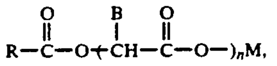

in which R is purported to be $C_{1-16}$ carbon atoms, a halo- or hydroxyl-substituted $C_{1-16}$ alkyl or a substituted aryl group, B is hydrogen or a $C_{1-3}$ alkyl group, M is hydrogen, $C_{1-4}$ alkyl or alkali metal, wherein n is an integer of at least one when M is an alkyl group or n is an integer of least two when M is hydrogen or alkali metal. The polymeric activators of Nakagawa et al., however, suffer from a fatal defect. They do not disclose, teach or suggest perhydrolysis leaving groups.

Schirmann et al., U.S. Pat. No. 4,221,675, substituted acyloxy N-acetamides of the structure

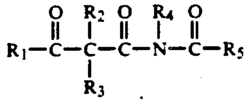

The activators of the present invention do not contain a nitrogen heteroatom as does the activator of Schirmann et al. Moreover, in Schirmann et al., the group in question, an amide, does not bind to the acyl portion of the compound via an oxygen bond. Schirmann et al. do not teach or suggest what peracid is generated or where perhydrolysis occurs. Applicants have demonstrated that the alpha acyloxy, N-acetylacetamide compounds disclosed in Schirmann et al. provide minimal perhydrolysis at site of the amide bond, if at all, and thus do not effectively generate the desired peracid, peralkanoyloxyacetic acid. Thus, Schirmann et al. also do not have an effective leaving group.

Various references have taught how to formulate bleach activator granules using activators of the prior art. For example, Corey et al., U.S. Pat. No. 3,661,789, Green et al., U.S. Pat. No. 4,009,113, Wevers, U.S. Pat. No. 4,087,369, Saran, U.S. Pat. No. 4,372,868, Gray et al., U.S. 4,399,049, Gray, U.S. Pat. No. 4,444,674, Thompson et al., U.S. Pat. No. 4,483,778, Murphy et al., U.S. Pat. No. 4,486,327, Thompson et al., U.S. Pat. No. 4,539,130, Chung et al., E.P. 106,634, Parfomak, U.K. 2,178,075 and Divo, U.S. Pat. No. 4,681,695, all discuss ways of combining a peroxygen bleach activator with some binding or enrobing material.

However, none of the foregoing references teaches, discloses or suggests bleach activator granules with the structure

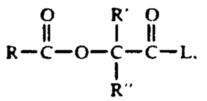

wherein R is $C_{1-20}$ branched or straight chain alkyl, alkoxylated alkyl, cycloalkyl, alkenyl, aryl, substituted aryl, alkylaryl; R′ and R″ are independently H, $C_{1-4}$ alkyl, aryl; and L is a leaving group.

Moreover, none of the art discloses, teaches or suggests that activators of the above structure can be incorporated in stabilized granules with improved perhydrolysis efficiency over the powdered activator alone. Additionally, none of the art discloses, teaches or suggests that activators of this type can be granulated with binding materials which have a melting completion temperature of at least about 40° C., said binding materials being in relatively small quantity with respect to the activator. Also, none of the art discloses, teaches or suggests that when these activator granules are incorporated into a detergent base, some detergent surfactants are preferred over others, and that certain stabilizing materials are especially preferred.

SUMMARY OF THE INVENTION AND OBJECTS

The invention provides, in one embodiment, stable bleach activator granules comprising:

a) a peroxygen bleach activator having the structure:

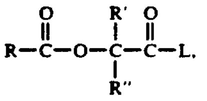

wherein R is $C_{1-20}$ branched or straight chain alkyl, alkoxylated alkyl, cycloalkyl, alkenyl, aryl, substituted aryl, alkylaryl; R′ and R″ are independently H, $C_{1-4}$ alkyl, aryl; and L is a leaving group;

b) a pliable binding material selected from materials having a melting completion temperature of greater than about 40° C.; and, optionally, c) a filler material.

In another embodiment, the invention provides stable bleach activator granules comprising:

a) a peroxygen bleach activator having the structure:

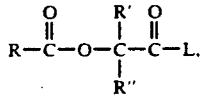

wherein R is $C_{1-20}$ branched or straight chain alkyl, alkoxylated alkyl, cycloalkyl, alkenyl, aryl, substituted aryl, alkylaryl; R′ and R″ are independently H, $C_{1-4}$ alkyl, aryl; and L is a leaving group;

b) an inorganic or organic binding material;

wherein said granules are approximately cylindrical or spherical, and have a diameter of about 25 to 2,000 microns, dissolve, in water, within about 10 minutes at 21° C., and have a pH of about 5 to 8 in water.

In still another embodiment, the invention provides an activated oxidant detergent comprising:

a) bleach activator granules comprising:

i) a peroxygen bleach activator having the structure:

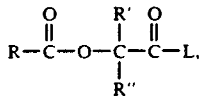

wherein R is $C_{1-20}$ branched or straight chain alkyl, alkoxylated alkyl, cycloalkyl, alkenyl, aryl, substituted aryl, alkylaryl; R′ and R″ are independently H, $C_{1-4}$ alkyl, aryl; and L is a leaving group;

ii) a pliable binding material selected from materials having a melting completion temperature of greater than about 40° C.; and, optionally, iii) a filler material;

b) a detergent base which comprises:

i) builders;

ii) fillers;

iii) a surfactant selected from the group consisting of anionic, nonionic, cationic, amphoteric, zwitterionic surfactants, and mixtures thereof; and c) a bleach-effective amount of a source of hydrogen peroxide, which acts in combination with the activator granules of a).

It is therefore an object of this invention to provide stable bleaching activator granules as hereinbefore described.

It is another object of this invention to enhance the performance of bleaching activator granules as hereinbefore described over that of the powdered activator.

It is still another object of this invention to provide bleach activator granules which are easily and efficiently processible.

It is yet another object of this invention to provide bleach activator granules which have as a majority of their content, the bleach activator compound.

It is a further object of this invention to provide an oxidant detergent composition which includes the stable bleach activator granules.

It is a still further object of this invention to improve the laundering performance of said oxidant detergent composition by careful selection of surfactants.

It is also an object of this invention to enhance the performance of said oxidant detergent by careful selection of stabilizing additives.

DETAILED DESCRIPTION OF THE PREFERRED EMBODIMENTS

Figure 1:
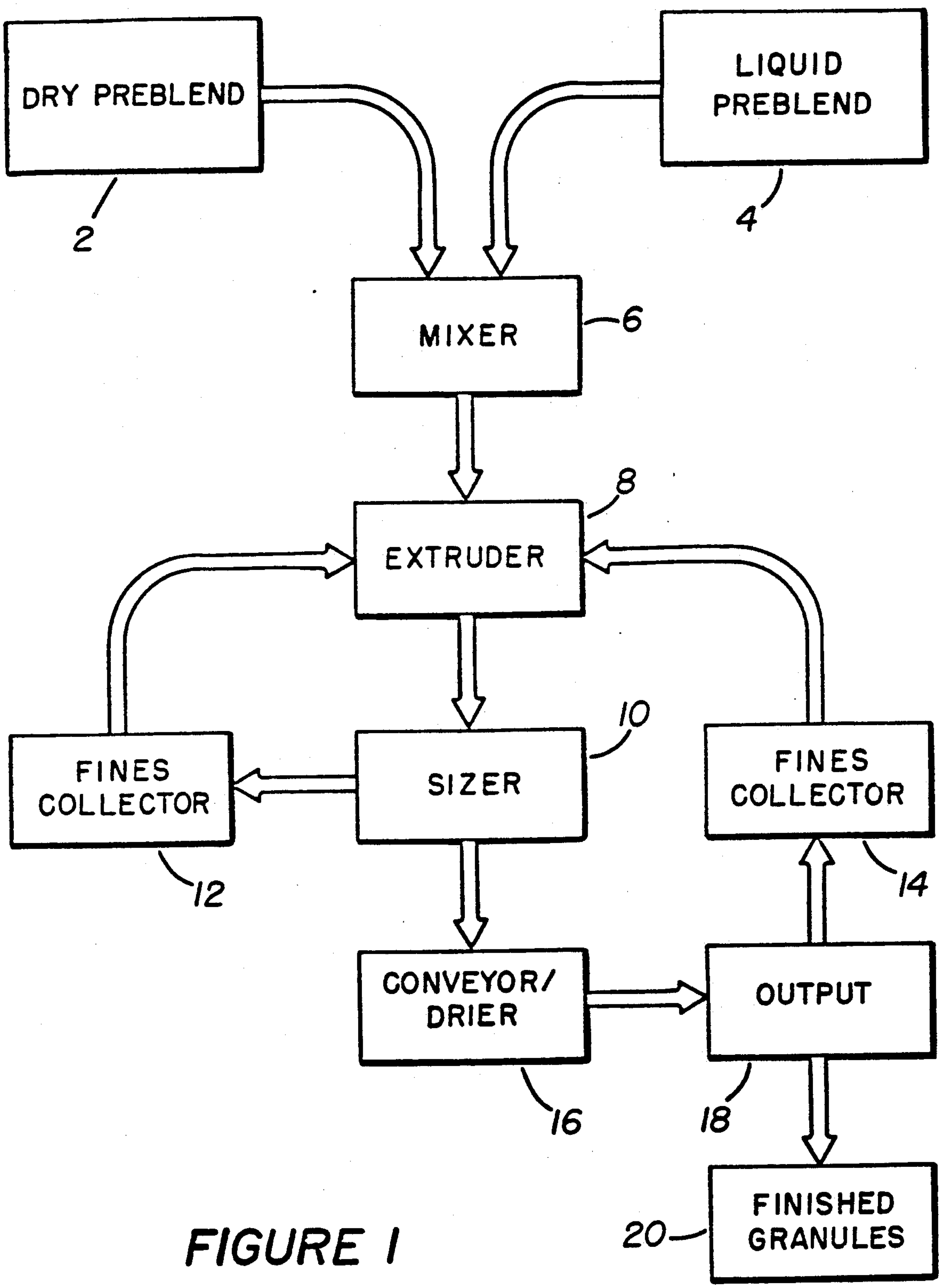
FIG. 1 shows a flow chart describing the manufacture of the bleach activator granules.

The present invention provides stable bleach activator granules comprising:

a) a peroxygen bleach activator having the structure:

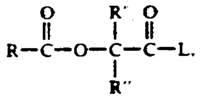

wherein R is $C_{1-20}$ branched or straight chain alkyl, alkoxylated alkyl, , cycloalkyl, alkenyl, aryl, substituted aryl, alkylaryl; R' and R'' are independently H, $C_{1-4}$ alkyl, aryl; and L is a leaving group;

b) a pliable binding material selected from materials having a melting completion temperature of greater than about 40° C.; and, optionally, c) a filler material.

The parent application, Ser. No. 06/928,070, filed Nov. 6, 1986, disclosed and claimed the activators which the Applicants process into the present inventive granules. The advantages of said activators are amply discussed in the specification of said application. While Applicants discuss some of the advantages of said activators in this application, for the sake of brevity, Applicants have incorporated Ser. No. 06/928,070 by reference thereto as if fully set forth herein, and will rely on its discussion therein. Additionally of interest is the related application of Richard R. Rowland, Ser. No. 07/167,544, filed Mar. 14, 1988, entitled "METHOD FOR SYNTHESIZING ACYLOXYCARBOXYLIC ACIDS," which discloses methods of acylating the hydroxycarboxylic acids which are predecessors to the activators of this invention. Said application is incorporated herein by reference.

Of particular interest from application Ser. No. 06/928,070 is a particularly preferred activator, namely,

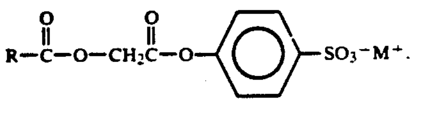

These types of activators are referred to as alkanoylglycolate or alkanoyloxyacetic acid esters, since their base carbonyl group is

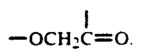

These types of activators provide numerous benefits over the prior art type activators. The Nakagawa et al. type polymeric activators do not teach, disclose or suggest a leaving group and if their monomer is used as an activator, little or no perhydrolysis occurs. The Schirmann et al. type activators similarly have little or no perhydrolysis.

In the following discussion, certain definitions are utilized:

Peracid precursor is equivalent to bleach activator. Both terms generally relate herein to reactive esters which have a leaving group substituent, which during perhydrolysis, actually cleaves off the acyl portion of the ester.

Perhydrolysis is the reaction which occurs when a peracid precursor or activator is combined in a reaction medium (aqueous medium) with an effective amount of a source of hydrogen peroxide.

The leaving group, L, is basically a substituent which is attached via an oxygen bond to the acyl portion of the ester and which can be replaced by a perhydroxide anion ($OOH^-$) during perhydrolysis.

The basic reaction is:

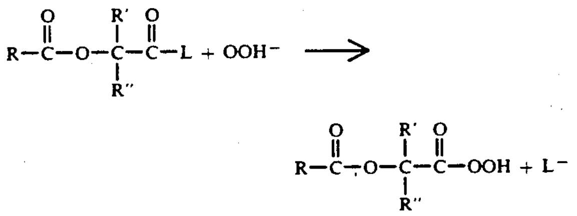

Although further discussion below will elaborate on the unique advantages of the preferred embodiment,

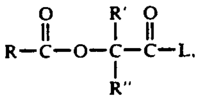

also referred to as a glycolate ester or as an acylglycolate ester, at present, the constituent portions of the ester, i.e., the acyl group and the leaving groups are herein defined.

R is defined as being $C_{1-20}$ linear or branched alkyl, alkoxylated alkyl, cycloalkyl, alkenyl, aryl, substituted aryl or alkylaryl.

It is preferred that R is $C_{1-20}$ alkyl or alkoxylated alkyl. More preferably, R is $C_{1-10}$, and mixtures thereof. R can also be mono-unsaturated or polyunsaturated. If alkoxylated, ethoxy (EO)—($-OCH_2CH_2$) and propoxy (PO)—($-OCH_2CH_2CH_2$),

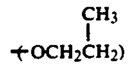

groups are preferred, and can be present, per mole of ester, from 1-30 EO or PO groups, and mixtures thereof.

It is especially preferred for R to be from 4 to 17, most preferably 5 to 12, carbons in the alkyl chain. Such alkyl groups would be surface active and would be desirable when the precursor is used to form surface active peracids for oxidizing fat or oil based soils from substrates at relatively low temperatures.

It is further highly preferred for R to be aryl and $C_{1-20}$ alkylaryl. A different type of bleaching compound results when aromatic groups are introduced onto the ester.

Alkyl groups are generally introduced onto the ester via an acid chloride synthesis discussed in Ser. Nos. 06/928,070 and 07/167,544. Fatty acid chlorides such as hexanoyl chloride, heptanoyl chloride, octanoyl chloride, nonanoyl chloride, decanoyl chloride and the like provide this alkyl moiety. Aromatic groups can be introduced via aromatic acid chlorides (e.g., benzoyl chloride) or aromatic anhydrides (e.g., benzoic acid anhydride).

R' and R" are independently H, $C_{1-10}$ alkyl, aryl, $C_{1-10}$ alkylaryl, and substituted aryl. When R' and R" are both alkyl, aryl, alkylaryl, substituted alkyl, or mixtures thereof, preferably the total number of carbons of R'+R" does not exceed about either 20, more preferably does not exceed about 18. Preferably, when R' or R" are carbylene or arylene, the other is H (i.e., unsubstituted). Alkyl of about 1-4 are preferred. If substituted aryl, appropriate substituents include OH, $SO_3^-$, and $CO_2^-$; $NR_3^{a+}$ ($R^a$ is $C_{1-30}$ carbons, and preferably, two of $R^a$ are short chain ($C_{1-4}$) alkyls and one of $R^a$ is a long chain alkyl ($C_{8-30}$). Appropriate counterions include $Na^+$, $K^+$, etc. and appropriate negative counterions include halogen (e.g., $Cl^-$), $OH^-$ and methosulfate. It is preferred that at least one of R' and R" be H, and most preferably, both (thus forming methylene).

The parent application stressed the importance of the R' and R" alpha, alpha substituents on the carbylene of the acyl group. This is because the position of various substituents alpha to the proximal carbonyl is very important to the activators.

The leaving group, as discussed above, is basically capable of being displaced by perhydroxide anion in aqueous medium. Unlike prior art precursors, the activator is not limited to leaving groups having particular solubility or reactivity criteria due to the reactiveness of the acyl of the inventive precursor. It is, however, preferred that the conjugate acid of the leaving group have a $pK_a$ of between about 4 to 20, more preferably, about 6 to 15.

Thus, the preferred leaving groups, none of which are meant to limit the invention, include:

(a) phenol derivatives
(b) halides
(c) oxynitrogen leaving groups
(d) carboxylic acid (from a mixed anhydride)

(a) Phenol Derivatives

The phenol derivatives can be generically defined as:

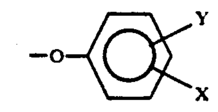

wherein Y and Z are, individually H, $SO_3M$, $CO_2M$, $SO_4M$, OH, halo substituent, $OR^1$, $R^2$, $NR_3^3X$, and mixtures thereof, wherein M is an alkali metal or alkaline earth counterion, $R^1$ of the $OR^1$ substituent is $C_{1-20}$ alkyl, $R^2$ is $C_{1-6}$ alkyl, $R_3^3$ of the $NR_3^3$ substituent is $C_{1-30}$ alkyl, X is a counterion therefor, and Y and Z can be the same or different.

The alkali metal counterions to sulfonate, sulfate or carbonate (all of which are solubilizing groups) include $K^+$, $Li^+$ and most preferably, $Na^{30}$. The alkaline earth counterions include $Sr^{++}$, $Ca^{++}$, and most preferably, $Mg^{++}$. Ammonium ($NH_4^+$) and other positively charged counterions may also be suitable. The halo substituent can be F, Br or most preferably, Cl. When $OR^1$, alkoxy, is the substituent on the phenyl ring, $R^1$ is $C_{1-20}$, and the criteria defined for R on the acyl group apply. When $R^2$ is the substituent the phenyl ring it is $C_{1-10}$ alkyl, with preference given to methyl, ethyl, n- and iso-propyl, n-, secand tert-butyl, which is especially preferred. When $—NR_3^3X$, quaternary ammonium, is the substituent, it is preferred that two of $R^3$ be short chain alkyls ($C_{1-4}$, most preferably, methyl) and one of the $R^3$ alkyls be longer chain alkyl (e.g., $C_{8-30}$), with X, a negative counterion, preferably selected from halogen ($Cl^-$, $F^-$, $Br^-$, $I^-$), $CH_3SO_4^-$ (methosulfate), $NO_3^-$, or $OH^-$.

Especially preferred are phenol sulfonate leaving groups. A preferred synthesis of phenol sulfonate esters which could be adapted for use herein is disclosed in Zielske, U.S. Pat. No. 4,735,740 commonly assigned to The Clorox Company, incorporated herein by reference.

Non-limiting preferred phenol derivatives are:

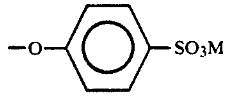 (sodium p-phenyl sulfonate)

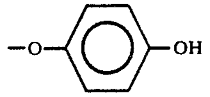 (p-, o- or m-dihydroxybenzene)

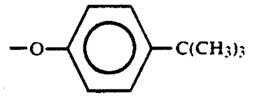 (t-butyl phenol)

(b) Halides

The halide leaving groups are quite reactive and actually are directly obtained as the intermediates in the synthesis of the phenyl sulfonate and t-butylphenol esters. While halides include Br and F, Cl is most Preferred. A non-limiting example is:

—Cl (chloride)

(c) Oxynitrogen

The oxynitrogen leaving groups are preferred. In the co-pending application entitled "Acyloxynitrogen Peracid Precursors," inventor Alfred G. Zielske, commonly assigned to The Clorox Company, Oakland, Calif., filed concurrently herewith, Ser. No. 06/928,065, filed Nov. 6, 1986, incorporated herein by reference, a detailed description of the synthesis of these leaving groups is disclosed. These oxynitrogen leaving groups are generally disclosed as $—ONR^5$, wherein $R^5$ comprises at least one carbon which is singly or doubly bonded directly to N. —$ONR^5$ is more specifically defined as:

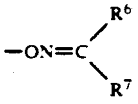

Oxime

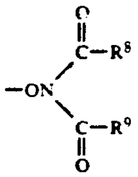
or
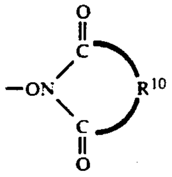

Hydroxyimide

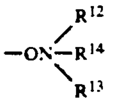
or
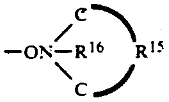

Amine Oxide

Oxime leaving groups have the structure

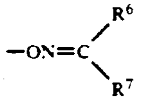

wherein $R^6$ and $R^7$ are individually H, $C_{1-20}$ alkyl, (which can be cycloalkyl, straight or branched chain), aryl, or alkylaryl and at least one of $R^6$ and $R^7$ is not H. Preferably $R^6$ and $R^7$ are the same or different, and range from $C_{1-6}$. Oximes are generally derived from the reaction of hydroxylamine with either aldehydes or ketones.

Non-limiting examples of an oxime leaving group are: (a) oximes of aldehydes (aldoximes), e.g., acetaldoxime, benzaldoxime, propionaldoxime, butylaldoxime, heptaldoxime, hexaldoxime, phenylacetaldoxime, p-tolualdoxime, anisaldoxime, caproaldoxime, valeraldoxime and p-nitrobenzaldoxime; and (b) oximes of ketones (ketoximes), e.g., acetone oxime (2-propanone oxime), methyl ethyl ketoxime (2-butanone oxime), 2-pentanone oxime, 2-hexanone oxime, 3-hexanone oxime, cyclohexanone oxime, acetophenone oxime, benzophenone oxime, and cyclopentanone oxime.

Particularly preferred oxime leaving groups are:

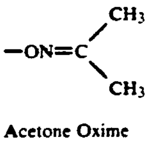

Acetone Oxime

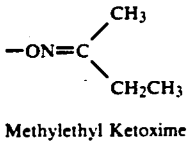

Methylethyl Ketoxime

Hydroxyimide leaving groups comprise:

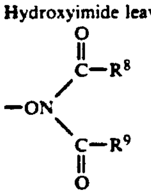
or
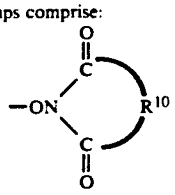

wherein $R^8$ and $R^9$ can be the same or different, and are preferably straight chain or branched $C_{1-20}$ alkyl, aryl, alkylaryl or mixtures thereof. If alkyl, $R^8$ and $R^9$ can be partially unsaturated. It is especially preferred that $R^8$ and $R^9$ are straight or branched chain $C_{1-6}$ alkyls, which can be the same or different. $R^{10}$ is preferably $C_{1-20}$ alkyl, aryl or alkylaryl, and completes a heterocycle. $R^{10}$ includes the preferred structure

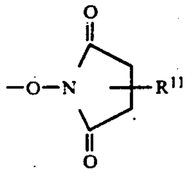

wherein $R^{11}$ can be an aromatic ring fused to the heterocycle, or $C_{1-6}$ alkyl (which itself could be substituted with water solubilizing groups, such as EO, PO, $CO_2^{31}$ and $SO_3^-$).

These esters of imides can be prepared as described in *Greene, Protective Groups in Organic Synthesis,* p. 183, (incorporated by reference) and are generally the reaction products of acid chlorides and hydroxyimides.

Non-limiting examples of N-hydroxyimide which will provide the hydroxyimide leaving groups of the invention include:

N-hydroxysuccinimide, N-hydroxyphthalimide, N-hydroxyglutarimide, N-hydroxynaphthalimide, N-hydroxymaleimide, N-hydroxydiacetylimide and N-hydroxydipropionylimide.

Especially preferred examples of hydroxyimide leaving groups are

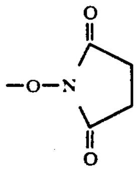

Oxysuccinimide

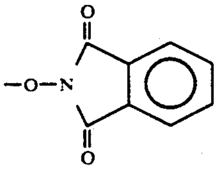

Oxyphthalimide

Amine oxide leaving groups comprise:

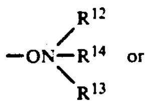
or
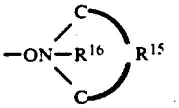

In the first preferred structure for amine oxides, $R^{12}$ and $R^{13}$ can be the same or different, and are preferably $C_{1-20}$ straight or branched chain alkyl, aryl, alkylaryl or mixtures thereof. If alkyl, the substituent could be partially unsaturated. Preferably, and $R^{12}$ and $R^{13}$ are $C_{1-4}$ alkyls and can be the same or different. $R^{14}$ is preferably $C_{1-30}$ alkyl, aryl, alkylaryl and mixtures thereof. This $R^{14}$ substituent could also be partially unsaturated. It is most preferred that $R^{12}$ and $R^{13}$ are relatively short chain alkyl groups ($CH_3$ or $CH_2CH_3$) and $R^{14}$ is preferably $C_{1-20}$ alkyl, forming together a tertiary amine oxide.

Further, in the second preferred amine oxide structure, $R^{15}$ can be $C_{1-20}$ alkyl, aryl or alkylaryl, and completes a heterocycle. $R^{15}$ preferably completes an aromatic heterocycle of 5 carbon atoms and can be $C_{1-6}$ alkyl or aryl substituted. $R^{16}$ is preferably nothing, $C_{1-30}$ alkyl, aryl, alkylaryl or mixtures thereof. $R^{16}$ is more preferably $C_{1-20}$ alkyl if $R^{15}$ completes an aliphatic heterocycle. If $R^{15}$ completes an aromatic heterocycle, $R^{16}$ is nothing.

Non-limiting examples of amine oxides suitable for use as leaving groups herein can be derived from: pyridine N-oxide, trimethylamine N-oxide, 4-phenyl pyridine N-oxide, decyldimethylamine N-oxide, dodecyldimethylamine N-oxide, tetradecyldimethylamine N-oxide, hexadecyldimethylamine N-oxide, octyldimethylamine N-oxide, di(decyl)methylamine N-oxide, di(-dodecyl)methylamine N-oxide, di(tetradecyl)methylamine N-oxide, 4-picoline N-oxide, 3-picoline N-oxide and 2-picoline N-oxide.

Especially preferred amine oxide leaving groups include:

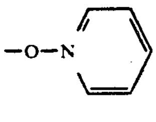

Pyridinium N-oxide

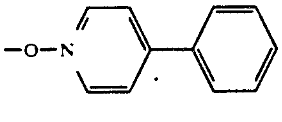

Phenylpyridinium N-oxide (d) Carboxylic Acids from Mixed Anhydrides

Carboxylic acid leaving groups have the structure

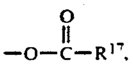

wherein $R^{17}$ is $C_{1-10}$ alkyl, preferably $C_{1-4}$ alkyl, most preferably either $CH_3$ or $CH_2CH_3$ and mixtures thereof.

When $R^{17}$ is $C_1$ and above, it is believed that the leaving groups will form carboxylic acids upon perhydrolytic conditions. Thus, when $R^{17}$ is $CH_3$, acetic acid would be the leaving group; when $CH_2CH_3$, propionic acid would be the leaving group, and so on. However, the foregoing theory is non-binding and offers only one explanation for what may be a very complicated reaction.

Non-limiting examples of mixed anhydride esters include:

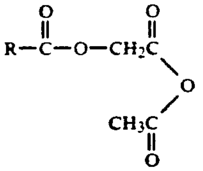

Alyanoyloxy acetic/acetic acid mixed anhydride;

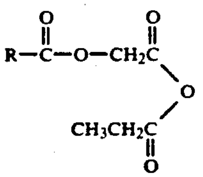

Alkanoyloxyacetic/Propoinic acid mixed anhydride.

ADVANTAGES OF THE STABLE BLEACH ACTIVATOR

As previously described in the parent application, U.S. Ser. No. 06/928,070, the activator provides numerous advantages over the prior art. For one, the activator is not tied to critical ratios of hydrogen peroxide source to activator, as are the fatty acid esters of Chung et al., U.S. Pat. No. 4,412,934. Additionally, because the activator presents multiple acyl functionalities, it can provide more than one type of peracid, thus boosting performance in laundering applications. For instance, a preferred activator, octanoyloxyacetate, phenol sulfonate ester, can give rise to three different peracids:

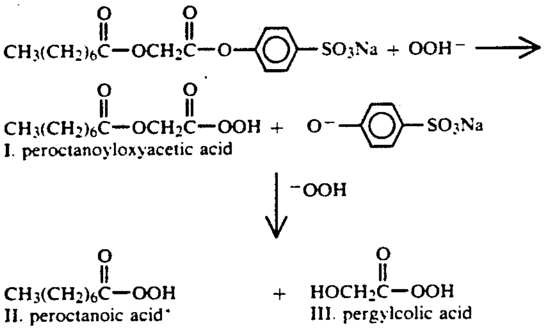

The prior art materials cannot provide these advantages.

For instance, one facially similar, but entirely inferior activator is disclosed in Schirmann et al., U.S. Pat. No. 4,221,675. A product coming within Schirmann et al's disclosure was synthesized, alpha-octanoyl, N-acetylacetamide, and perhydrolysis studies were conducted to see what reactions were being generated. In conducting the study, it was assumed that perhydrolytic attack on the compound could take place at one or all or a combination of three sites:

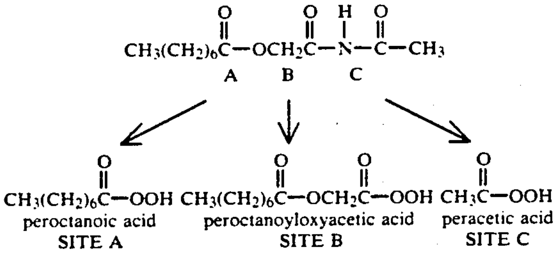

Three moles of hydrogen peroxide per mole of activator (one per carbonyl site) were reacted with this alpha-octanoyloxy, N-acetylacetamide.

Tallying the reaction products via high performance liquid chromatography (HPLC) using an adaptation of the potentiometric methods set forth in Isaakson et al, "Reaction Detector for Liquid Chromatography with Electrochemical Generation and Detection of Excess of Bromine," *J. Chromatography. Vo.* 324, pp. 333 et seq. (1986), the results were:

TABLE I

Perhydrolysis Profile[1] of -octanoyloxy, N-acetylacetamide

| | | pH | | |
|---|---|---|---|---|
| Peracid/Product | Site | 10.5 | 9.5 | 8.5 |
| Peroctanoic Acid | A | 27.3% | 8.60% | 0.83% |
| Peroctanoyloxyacetic Acid | B | 2.1% | 0.59% | 0.00% |
| Peracetic Acid | C | 9.1% | 5.3% | 0.20% |
| Octanoyloxyacetic Acid | hydrolysis | 55.0% | n/a[2] | n/a[2] |

TABLE I-continued

Perhydrolysis Profile[1] of -octanoyloxy, N-acetylacetamide

| Peracid/Product | Site | pH 10.5 | 9.5 | 8.5 |
|---|---|---|---|---|
| | at B | | | |

[1]Assuming three perhydrolytic sites. 14 ppm A.O. theoretical maximum yield. HPLC at 13 minutes
[2]not available Review of the above discloses that the major reaction of the compound alpha-octanoyloxy, N-acetylacetamide is hydrolysis, not perhydrolysis. Additionally, primary sites for perhydrolysis are at a and c, meaning that site b is very inefficient. This is to be compared with one of the preferred activators, octanoyloxy acetic acid, phenyl sulfonate ester, which has the majority of perhydrolysis at site B, little at site A:

TABLE II

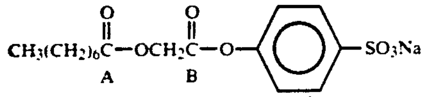

Perhydrolysis Profile of[1] Octanoyloxyacetic Acid. Phenyl Sufonate Ester

| Peracid/Product | pH 10.5[2] | 10.5[3] | 9.5[4] | 8.5[5] |
|---|---|---|---|---|
| Peroctanoic Acid | 4% | 10% | 4% | 3% |
| Peroctanoyloxyacetic Acid | 59% | 55% | 62% | 41% |
| Perglycolic Acid | 5% | 11% | 3% | 3% |
| Octanoyloxyacetic Acid | 23% | 15% | 15%[6] | 32% |

[1]Date obtained from HPLC. 2:1 peroxide : precursor ratio, based on two minutes from start from perhydrolysis.
[2]Initial precursor concentration: 0.8 mM
[3]Initial precursor concentration. 6.0 mM
[4]Initial precursor concentration: 6.0 mM
[5]Initial precursor concentration. 6.0 mM
[6]Estimated Nakagawa et al., U.S. Pat. No. 3,960,743, discloses contended bleach activators of the structure:

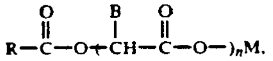

in which B is H or $C_{1-3}$ alkyl, M is $C_{1-4}$ alkyl, H, or alkali metal salt. This structure can be divided into two categories: (b 1) when M is $C_{1-4}$ alkyl, n can be 1, thus providing an alkyl ester of acylglycolic acid; and (2) when M is H or alkali metal salt, n must be greater than 1, thus the compound must be polymeric.

In the case of (1), M completing an alkyl ester, it is clear that M does not function as a leaving group. Alkyl alcohols are not leaving groups.

In the case of (2), M is H or alkali metal salt, these again do not function as leaving groups.

In the case where M is H or alkali metal salt, a compound which is representative of Nakagawa et al, namely, octanoyloxyacetic acid, was tested for perhydrolytic performance. (If placed in an alkaline medium, this acid would be neutralized, i.e., deprotonated, and would form the alkali metal salt. Thus, this compound is representative of either M is H or alkali metal salt.) Octanoyloxyacetic acid has the structure

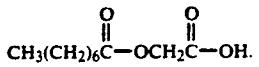

The compound can be synthesized as described in the parent application. Ser. No. 06/928.070, at pages 33-34 thereof.

In testing this representative compound, the following conditions were used:

| | | |
|---|---|---|
| Octanoyloxyacetic Acid: | $8.75 \times 10^{-4}$M | (dissolved in 3 ml of 50/50 vol./vol. dioxane/water) |
| Hydrogen Peroxide: | $1.65 \times 10^{-3}$M | |
| Temperature: | 21° C. | |
| pH: | 10.5 | |
| Buffer: | 0.02M | ($NaCO_3$/$NaHCO_3$) |

Thus, 1.9 moles of $H_2O_2$ per mole of this "activator" were placed in aqueous solution.

Tallying the reaction products via high performance liquid chromatography (HPLC) using an adaptation of the potentiometric methods set forth in Isaakson et al, "Reaction Detector for Liquid Chromatography with Electrochemical Generation and Detection of Excess of Bromine," *Chromatography,* Vol. 324, pp. 333 et seq. (1986), the results were:

TABLE III

Perhydrolysis Profile of Octanoyloxyacetic Acid

| Time (min.) | Total A.O.[1] Concentration | Peracid[2] Concentration | Octanoyloxyacetic Acid[3] Concentration |
|---|---|---|---|
| 5 | 1.76 mM | N/D[4] | 0.85 mM |
| 10 | 1.52 mM | N/D[4] | 0.84 mM |
| 20 | 1.64 mM | N/D[4] | 0.88 mM |

[1]Total Active Oxygen ("AO") concentration (mM) determined by iodide/thiosulfate titration using molybdate catalyst; includes $H_2O_2$ and peracids.
[2]Peracid concentration (mM) determined by iodide/thiosulfate titration after treatment with catalase enzyme to eliminate the hydrogen peroxide.
[3]Concentration (mM) measured by HPLC.
[4]Not detected; additionally, no peracids were detected by HPLC (detection limit is 0.001 mM).

Thus, as seen from the above, neither Schirmann et al. nor Nakagawa et al. provide the benefits of the activators of the invention.

Stable Bleach Activator Granules

While it has been disclosed by Applicants in the parent application, that substituting solubilizing groups may improve the solubility and enhance the reactivity of the activators, the present invention concerns combining the activator with a suitable binding material in order to form granules which are stable upon storage and which form peracid more efficiently.

The granules are formed by combining the hereinbefore-described activators with pliable binding materials having a melting completion temperature of at least about 40° C. It is preferred to include a filler material which can control solubility of the granule and for good handling characteristics.

1. Binder Material

The binder material is critical to the invention. It should be an organic material which has a melting completion temperature (melting point) above about 40° C., more preferably above about 50° C. The material should not react with either the activator, or, if the granules are combined with an oxidant-containing detergent, with the components of such detergent during storage thereof. The binder should ideally have low hygroscopicity, yet be soluble or dispersible in aqueous solution, preferably at low temperatures. The binder should also be able to form a paste or doughy mass suitable for forming noodles, and after processing, granules. Workability, viscosity, pliability, and miscibility in water, of the binder should be optimal, depending on the process used.

Types of materials suitable for use include, without limitation:

ORGANIC MATERIALS

1. Nonionic Surfactants.
2. Anionic Surfactants.
3. Cationic Surfactants.
4. Film-forming polymers.
5. $C_{12}$-$C_{18}$ Fatty acids or salts thereof.
6. $C_{12}$-$C_{24}$ Aliphatic alchols.
7. Relatively low molecular weight polyethylene glycols (2,000-10,000).
8. Sodium alkyl glyceryl ether sulfonate (sodium coconut oil, fatty acids monoglyceric sulfonates and sulfates); sodium alkyl ether sulfonates; alkylphenol-ethylene oxide ether sulfate; and esters of alpha-sulfonated fatty acid.
9. Acrylic acid, hydroxyacrylic acid, methacrylic acid polymers; co-polymers of ethylene styrene and vinyl methyl ether (e.gs., Versicol & Gantrez).
10. Cellulose acetate esters, cellulose acetate sulfate, cellulose sulfates, hydroxyethyl cellulose sulfate, methylcellulose sulfate, hydroxypropylcellulose sulfate.
11. Starch, starch/ether.
12. Sodium carboxymethyl cellulose.
13. Polyvinyl alcohol.
14. Gelatin.
15. HPL (National Starch & Chemical Corp., (an amylopectin food starch).
16. Cross-linked pre-gelatinized amylope (e.g., Clear-jel, National Starch & Chemical Corp.).

The binder material imparts physical integrity to the particle which is important in particle crush durability. Although organic binders are preferred, certain silicates may also be suitable for use. Other binders disclosed in Chung et al., EP 106 634 (incorporated herein by reference) are suitable for use. The binder also aids in the dispersion of the particle and solubilization of the precursor. Preferred binder materials were selected from the following classes of compounds: Calsoft F90, Calsoft L40 and Biosoft D62 from the linear alkylbenzene sulfonates; Carbowax 3350, 4600 and 8000, from polyethylene glycols; Span 40 from substituted sorbitans; Triton CF54 from alkyl aryl polyethoxy adducts; Pluronic F125 from block copolymers of propylene and ethylene oxide; Alfonic 1618-80, Brij-58, and Neodol 45-13 from ethoxylated alcohols; sodium palmitate from fatty acid salts; and polyacrylic acid. Of these the Calsoft materials, Alfonic 1618-80 and Carbowax 4600 (polyethylene glycol, Mol. wt.=4,600) were found to be most preferred. The especially preferred binding materials consist of a 50/50 wt./wt. combination of Calsoft L40 (a $C_{11.5}$ linear alkyl benzene sulfonate, sodium salt, 40% active, from Pilot Chemical Co.) and Alfonic 1618-80 (a $C_{16-18}$ ethoxylated alcohol, with about 10.7 moles of ethylene oxide per mole of alcohol, 100% active, from Vista Chemicals); and Carbowax 4600 and Calsoft L40 in 50/50 wt./wt. mixture, based on actives.

2. Filler/Diluent

A filler or diluent can be used to control solubility of the granule and to assure optimal processibility of the noodle. The diluent also helps in the dispersion of the precursor by allowing the particles to break up more readily when placed into an aqueous medium. The nature of the diluent should be such that it does not react with the other components of the particles, is readily soluble, not hygroscopic and can be powdered to the same mesh size as the precursor. The filler is any inert salt such as $Na_2SO_4$, $Na_2CO_3$, NaCl, boric acid, borax, and other alkali metal salts. It is preferable that water-insoluble materials be limited, e.g., $CaCO_3$, $MgCO_3$, etc.

3. Forming the Granules

The activator, binder and diluent/filler are combined, usually with additional water (although some binders, e.g., surfactants, are supplied by manufacturers as aqueous solutions, so the amount of added water can be limited or varied as needed) in order to form a workable paste or doughy mass.

The process of preference is referred to as extrusion, in which material as hereinbefore described are processed into a doughy mass and extruded through a die-plate or other sizing means to form long noodles. Such noodles are then dried and chopped or vibrated or otherwise formed into granules. Alternatively, the granules could be formed by agglomeration or spray bed process, both of which form a part of the invention.

The noodles are prepared by first dry mixing the solid components of the formulation, which includes activator, diluent, and optional colorant, to form an evenly distributed dry powder. This mixture is then added to fluid hot melted binder or to a warm aqueous solution of binder to form a doughy mass. The doughy mass can be further moistened to aid processing by the addition of 2-15% water by weight of the mixture. The substantially homogeneous mass is then extruded through a 0.25 mm-2 mm diameter die hole. Noodle extrudate is then dried to a water content of preferably less than 3% by weight of the processed noodle. The dried noodles are then chopped down to lengths not greater than 5 mm.

By reference to FIG. 1, a flow diagram of the process, a simplified description of a non-limiting embodiment of the process can be demonstrated. The dry components (activator, diluent and optional colorant) are dry-mixed to form a dry preblend 2. Secondly, the liquid components (surfactants, polymers, i.e., binders, and water) are mixed to form a liquid preblend 4. These two product streams are added in a mixer 6 which forms the doughy mass. The mass is passed through to an extruder 8. This can comprise an inverted-funnel-shaped hopper provided with screws in the bottom thereof. The screws work the mass and channel it to a die plate, grate, or other means of reducing the mass size. As the mass is forced out of the die, it produces long "noodles," which then fall into a sizer 10. The sizer can be a shaker bed, which is a vibrating bed which breaks the noodles up into the desired shapes and sizes of granules. The sizer could alternatively be a continuous conveyor or combined with a vibrator or with a spike to break up the noodles, in which case the process can be continuous (the conveyor could carry off the desired particles, while the fines could be recycled.) The fines, particles less than about 0.1 mm in length, could be shaken off to a collector 12, which preferably recycles the fines to the extruder 8. The granules could then be dried in a drier 16, then outputted to a collector 18, with fines again siphoned off via a fines collector 14, which preferably recycles such fines. The finished granules 20 are then packaged or further taken via conveyor to be combined with the detergent base.

4. The Granules

The granules have increased storage stability over unprocessed precursor, good crush durability properties and dissolve readily in the wash water. The noodle particles preferably comprise from 50-99, more preferably 80-97 percent precursor, from 0.5-25 more preferably 3-15, percent binder, from 0-25, more preferably 0-5, most preferably 0.1-5, percent diluent and from 0-5 percent water based on the weight of the processed noodle. An optional colorant can also be present in the noodle in the range of from 0-5 percent by weight of the processed noodle. All ingredients of this particle composition are evenly distributed throughout the particle.

The granule size is an important factor in storage stability and solubility of the particle. It is preferred that the noodles have a diameter in the range of 2 to 0.25, more preferably 1.5 to 0.3, most preferably 1.0 to 0.5 mm. Optimally, they will be 0.75 mm in diameter. The length of the particle is preferred to be from 0.1 to 5 mm, more preferably 0.5 to 3 mm long. The particles are preferably cylindrical in shape. Alternatively, they may be spherical, with the preferred diameters given above.

In the granules, the proportions of ingredients should be preferably between 99:0.5:0.5 to 50:25:25 activator: binder: diluent, more preferably 98:1:1-75:12.5:12.5. High amounts of activator are desirable in order to enhance the finished product's performance and to reduce the overall percentage of activator granules in the detergent for cost efficiency. The particles should dissolve in water within about 10 minutes at 21° C.

5. The Detergent Compositions

The activator granules of the invention are combined with a detergent base, said base comprising:

builders; and a surfactant selected from the group consisting of anionic, nonionic, cationic, amphoteric, zwitterionic surfactants, and mixtures thereof; and a bleach-effective amount of a source of hydrogen peroxide to interact with the activator granules.

Each of these components, and adjunct materials suitable for use herein are further discussed below:

6. Builders

The builders are typically alkaline builders, i.e., those which in aqueous solution will attain a pH of 7-14, preferably 9-12. Examples of inorganic builders include the alkali metal and ammonium carbonates (including sesquicarbonates and bicarbonates), phosphates (including orthophosphates, tripolyphosphates and tetrapyrophosphates), aluminosilicates (both natural and synthetic zeolites), and mixtures thereof. Carbonates are especially desirable for use in this invention because of their high alkalinity and effectiveness in removing hardness ions which may be present in hard water, as well as their low cost. Carbonates can be used as the Predominant builder. Silicates ($Na_2O$:$SiO_2$, modulus of 4:1 to 1:1, most preferably about 3:1 to 1:1) can also be used. Silicates, because of their solubity in water and ability to form a glassy matrix, can also advantageously used as a binder for the detergent.

Organic builders are also suitable for use, and are selected from the group consisting of the alkali metal and ammonium sulfosuccinates, polyacrylates, polymaleates, copolymers of acrylic acid and maleic acid or maleic anhydride, citrates and mixtures thereof.

7. Fillers/Diluents

The same materials as used in the manufacture of the granules can be used herein as fillers for the detergent. Salts such as NaCl, $Na_2SO_4$, and borox, are preferred. Organic diluents, such as sugar, are possible.

8. Surfactants

Particularly effective surfactants appear to be anionic surfactants. Examples of such anionic surfactants may include the ammonium, substituted ammonium (e.g., mono-, di-, and tri-ethanolammonium), alkali metal and alkaline earth metal salts of $C_6$-$C_{20}$ fatty acids and rosin acids, linear and branched alkyl benzene sulfonates, alkyl sulfates, alkyl ether sulfates, alkane sulfonates, olefin sulfonates, hydroxy alkane sulfonates, fatty acid monoglyceride sulfates, alkyl glyceryl ether sulfates, acyl sarcosinates and acyl N-methyltaurides. Preferred are aromatic sulfonated surfactants. Of particular preference are linear and branched $C_{6-18}$ alkyl benzene sulfonates, both the salts thereof as well as the acidic form. Most preferred are the acidic alkyl benzene sulfonates such as Biosoft S100 and S130, with the latter especially preferred.

Other preferred surfactants of use include linear ethoxylated alcohols, such as those sold by Shell Chemical Company under the brand name Neodol. Other suitable nonionic surfactants can include other linear ethoxylated alcohols with an average length of 6 to 16 carbon atoms and averaging about 2 to 20 moles of ethylene oxide per mole of alcohol; linear and branched, primary and secondary ethoxylated, propoxylated alcohols with an average length of about 6 to 16 carbon atoms and averaging 0-10 moles of ethylene oxide and about 1 to 10 moles of propylene oxide per mole of alcohol; linear and branched alkylphenoxy (polyethoxy) alcohols, otherwise known as ethoxylated alkylphenols, with an average chain length of 8 to 16 carbon atoms and averaging 1.5 to 30 moles of ethylene oxide per mole of alcohol; and mixtures thereof.

Further suitable nonionic surfactants may include polyoxyethylene carboxylic acid esters, fatty acid glycerol esters, fatty acid and ethoxylated fatty acid alkanolamides, certain block copolymers of propylene oxide and ethylene oxide, and block polymers of propylene oxide and ethylene oxide with propoxylated ethylene diamine. Also included are such semi-polar nonionic surfactants like amine oxides, phosphine oxides, sulfoxides, and their ethoxylated derivatives.

Suitable cationic surfactants may include the quaternary ammonium compounds in which typically one of the groups linked to the nitrogen atom is a $C_{12}$-$C_{18}$ alkyl group and the other three groups are short chained alkyl groups which may bear substituents such as phenyl groups.

Further, suitable amphoteric and zwitterionic surfactants which contain an anionic water-solubilizing group, a cationic group and a hydrophobic organic group may include amino carboxylic acids and their salts, amino dicarboxylic acids and their salts, alkylbetaines, alkyl aminopropylbetaines, sulfobetaines, alkyl imidazolinium derivatives, certain quaternary ammonium compounds, certain quaternary phosphonium compounds and certain tertiary sulfonium compounds. Other examples of potentially suitable zwitterionic surfactants can be found described in Jones, U.S. Pat. No. 4,005,029, at columns 11-15, which are incorporated herein by reference.

Further examples of anionic, nonionic, cationic and amphoteric surfactants which may be suitable for use in this invention are depicted in Kirk-Othmer, *Encyclopedia of Chemical Technology*, Third Edition, Volume 22, pages 347-387, and *McCutcheon's Detergents and Emulsifiers*, North American Edition, 1983, which are incorporated herein by reference.

As mentioned hereinabove, other common detergent adjuncts may be added if a bleach or detergent bleach product is desired. If, for example, a detergent composition is desired, the following ranges (weight %) appear practicable:

| | |
|---|---|
| 0.5-50.0% | Hydrogen Peroxide Source |
| 0.05-25.0% | Precursor |
| 1.0-50.0% | Surfactant |
| 1.0-50.0% | Builder |
| 5.0-99.9% | Filler, stabilizers, dyes, Fragrances, brighteners, etc. |

9. Hydrogen Peroxide Source

The hydrogen peroxide source may be selected from the alkali metal salts of percarbonate, perborate, persilicate and hydrogen peroxide adducts.

Most preferred are sodium percarbonate, and sodium perborate mono- and tetrahydrate. Other Peroxygen sources may be possible, such as alkaline earth and alkali metal peroxides, monopersulfates and monoperphosphates.

The range of peroxide to activators is preferably determined as a molar ratio of peroxide to activator. Thus, the range of peroxide to each activator is a molar ratio of from about 1:1 to 20:1, more preferably about 1:1 to 10:1 and most preferably about 1:1 to 5:1. This is also the definition of a bleach effective amount of the hydrogen peroxide source. It is preferred that this activator peroxide composition provide about 0.5 to 100 ppm peracid A.O., and most preferably about 1 to 50 ppm peracid A.O., and most preferably about 1 to 20 ppm peracid A.O., in aqueous media.

A description of, and explanation of, A.O. measurement is found in the article of Sheldon N. Lewis. "Peracid and Peroxide Oxidations," In: *Oxidation*, 1969, pp. 213-258, which is incorporated herein by reference. Determination of the peracid can be ascertained by the analytical techniques taught in *Organic Peracids*, (Ed. by D. Swern), Vol. 1, pp. 501 et seg. (Ch.7) (1970), incorporated herein by reference.

10. Chelating Agents

In some of the compositions herein, it is especially preferred to include a chelating agent, most preferably, an aminopolyphosphonate. These chelating agents assist in maintaining the solution stability of the activators in order to achieve optimum perhydrolysis. In this manner, they are acting to chelate heavy metal ions, which cause catalyzed decomposition of the in situ formed peracid, although this is a non-binding theory of their action and not limiting to Applicants. The chelating agent is selected from a number of known agents which are effective at chelating heavy metal ions. The chelating agent should be resistant to hydrolysis and rapid oxidation by oxidants. Preferably, it should have an acid dissociation constant ($pK_a$) of about 1-9, indicating that it dissociates at low pH's to enhance binding to metal cations. The most preferred chelating agent is an aminopolyphosphonate which is commercially available under the trademark Dequest, from Monsanto Company. Examples thereof are Dequest 2000, 2041 and 2060. (See also Bossu, U.S. Pat. No. 4,473,507, column 12, line 63 through column 13, line 22, incorporated herein by reference). A polyphosphonate, such as Dequest 2010, is also suitable for use. Other chelating agents, such as ethylenediaminetetraacetic acid (EDTA) and nitrilotriacetic acid (NTA) may also be suitable for use. Mixtures of the foregoing may be suitable. Effective amounts of the chelating agent range from 1-1,000, more preferably 5-500, most preferably 10-100 ppm chelating agent, in the wash liquor.

11. Adjuncts

The standard detergent adjuncts can be included in the present invention.

These include enzymes are especially desirable adjunct materials in these detergent products. However, it may be preferred to include an enzyme stabilizer.

Proteases are one especially preferred class of enzymes. They are selected from acidic, neutral and alkaline proteases. The terms "acidic," "neutral," and "alkaline," refer to the pH at which the enzymes' activity are optimal. Examples of neutral proteases include Milezyme (available from Miles Laboratory) and trypsin, a naturally occurring protease. Alkaline proteases are available from a wide variety of sources, and are typically produced from various microorganisms (e.g., *Bacillis subtilisis*). Typical examples of alkaline proteases include Maxatase and Maxacal from International BioSynthetics, Alcalase, Savinase and Esperase, all available from Novo Industri A/S. See also Stanislowski et al., U.S. Pat. No. 4,511,490, incorporated herein by reference.

Further suitable enzymes are amylases, which are carbohydrate-hydrolyzing enzymes. It is also preferred to include mixtures of amylases and proteases. Suitable amylases include Rapidase, from Societe Rapidase, Milezyme from Miles Laboratory, and Maxamyl from International BioSynthetics.

Still other suitable enzymes are cellulases, such as those described in Tai, U.S. Pat. No. 4,479,881, Murata et al., U.S. Pat. No. 4,443,355, Barbesgaard et al., U.S. Pat. No. 4,435,307, and Ohya et al., U.S. Pat. No. 3,983,082, incorporated herein by reference.

Yet other suitable enzymes are lipases, such as those described in Silver, U.S. Pat. No. 3,950,277, and Thom et al., U.S. Pat. No. 25 4,707,291, incorporated herein by reference.

The hydrolytic enzyme should be present in an amount of about 0.01-5%, more preferably about 0.01-3%, and most preferably about 0.1-2% by weight of the detergent. Mixtures of any of the foregoing hydrolases are desirable, especially protease/amylase blends.

Additionally, optional adjuncts include dyes, such as Monastral blue and anthraquinone dyes (such as those described in Zielske, U.S. Pat. No. 4,661,293, and U.S. Pat. No. 4,746,461).

Pigments, which are also suitable colorants, can be selected, without limitation, from titanium dioxide, ultramarine blue (see also, Chang et al., U.S. Pat. No. 4,708,816), and colored aluminosilicates.

Fluorescent whitening agents are still other desirable adjuncts. These include the stilbene, styrene, and naphthalene derivatives, which upon being impinged by ultraviolet light, emit or fluoresce light in the visible wavelength. These FWA's or brighteners are useful for improving the appearance of fabrics which have become dingy through repeated soilings and washings. Preferred FWA's are Tinopal 5BMX-C and Tinopal RBS, both from Ciba Geigy A.G., and Phorwite RKH, from Mobay Chemicals. Examples of suitable FWA's can be found in U.S. Pat. Nos. 1,298,577, 2,076,011, 2,026,054, 2,026,566, 1,393,042; and U.S. Pat. Nos. 3,951,960, 4,298,290, 3,993,659, 3,980,713 and 3,627,758, incorporated herein by reference.

Anti-redeposition agents, such as carboxymethylcellulose, are potentially desirable. Next, foam boosters, such as appropriate anionic surfactants, may be appropriate for inclusion herein. Also, in the case of excess foaming resulting from the use of certain surfactants, anti-foaming agents, such as alkylated polysiloxanes, e.g., dimethylpolysiloxane, would be desirable. Fragrances are also desirable adjuncts in these compositions, although the activators herein have much lower odor than the fatty acid esters such as those in Chung et al., U.S. Pat. No. 4,412,934.

The additives may be present in amounts ranging from 0–50%, more preferably 0–30%, and most preferably 0–10%. In certain cases, some of the individual adjuncts may overlap in other categories. However, the present invention contemplates each of the adjuncts as providing discrete performance benefits in their various categories. The EXPERIMENTAL section below demonstrates the advantages of the inventive bleach activators and the detergents containing them.

TABLE IV

| Bleach Activator Granules | |
|---|---|
| Wt. % | Component |
| 90 | Precursor |
| 2.5 | Binder, $C_{16-18}$ ethoxylated alcohol (Alfonic 1618-80 from Vista Chemical Co.). |
| 2.5 | Binder, $C_{12}$ sodium alkyl aryl sulfonate (Calsoft L40 from Pilot Chemical Co.), on an actives basis. |
| 5 | Diluent, can be any inert salt such as $Na_2SO_4$, $Na_2CO_3$, NaCl, etc. |

TABLE V

| Detergent Formulation | |
|---|---|
| COMPONENT | Wt % |
| Na Tripolyphosphate | 33.21 |
| HLAS | 11.29 |
| Na Perborate Monohydrate | 7.46 |
| $Na_2CO_3$ | 40.40 |
| Silicate | 4.98 |
| Moisture | 2.66 |
| | 100.00 |

TABLE VI

| Detergent + Activator Formulation | |
|---|---|
| Component | Wt. % |
| Na Tripolyphosphate | 27.16 |
| HLAS (Biosoft S130) | 9.23 |
| Na Perborate Monohydrate | 6.10 |
| $Na_2CO_3$ | 33.04 |
| Silicate | 4.07 |
| Activator Granules | 8.94 |
| $Na_2SO_4$ | 6.74 |
| Alcosperse[1] | 0.32 |
| Ultramarine Blue[2] | 0.15 |
| FWA[3] | 0.32 |
| Dequest 2006[4] | 0.50 |
| Savinase[5] | 0.91 |
| Fragrance | 0.20 |
| Moisture | 2.32 |
| | 100.00 |

[1]Polyacrylic Acid Binder, Alco Company.
[2]Colorant.
[3]Fluorescent whitening agent.
[4]Chelating agent, Monsanto Company.
[5]Protease enzyme, Novo Industri A/S.

Solubility and Crush Durability

The results in TABLE VII show the solubility index and crush durability for several noodle compositions. The solubility index is defined as the time in minutes required for a 0.2 g sample to completely dissolve in 500 mL water at about 21° C. under constant stirring to yield a 2 cm vortex in a 1 liter beaker. The crush durability factor is the weight in grams required to crush a 2 mm (length) granule between glass plates.

TABLE VII

Granules and Their Solubility Index and Crush Durability

| Binder | % Activator | % Binder | % Diluent | Solubility (Mins.) | Crush Factor (in grams) |
|---|---|---|---|---|---|
| Alfonic[1] 1618-80 | 90[2] | 10 | 0 | 5.23 | 40 |
| | 85[2] | 15 | 0 | 3.88 | 63 |
| | 80[2] | 20 | 0 | 3.75 | 81 |
| | 80[2] | 15 | 5 | 3.4 | 55 |
| Calsoft F90[3] | 100[2] | 0 | 0 | 10.0 | <40 |
| | 90[2] | 10 | 0 | 2.1 | 40 |
| | 85[2] | 15 | 0 | 1.5 | 40 |
| | 80[2] | 20 | 0 | 2.0 | 40 |
| 50/50 Blend PEG 4600[5]/ Calsoft L40[4] | 90[6] | 5 | 5 | 3.0 | 111 |
| 50/50 Blend Alfonic[1] 1618-80/ Calsoft L40[4] | 90[6] | 5 | 5 | 3.5 | 76 |

[1]Nonionic surfactant, Vista Chemical Company.
[2]Activator is sodium octanoyloxyacetate, phenol sulfonate ester.
[3]Anionic surfactant, Pilot Chemical Company, 90% active.
[4]Anionic surfactant, Pilot Chemical Company, 40% active.
[5]Polyethylene glycol (M.Wt. = 4,600), Union Carbide.
[6]Activator is sodium nonanoyloxyacetate, phenol sulfonate ester.

Perhydrolysis and Storage Stability

The following granular dry bleaching compositions were prepared:

| Component | Wt. in Grams |
|---|---|
| Na Perborate Monohydrate | 0.175 g (28 ppm A.O.) |
| $Na_2CO_3$ | 1.200 g |
| Activator (via granule or powder) | gram amount equivalent to 14 ppm A.O. theoretical |

The perhydrolysis profiles of the above bleach compositions (see TABLE IX, below) were carried out in the presence of Tide® (Procter & Gamble Company) detergent. The composition (approximate) of this detergent is shown below in Table VIII.

TABLE VIII

| Composition of Tide ® Detergent | |
|---|---|
| Component | Wt. % |
| $Na_2CO_3$ | 14.7 |
| Na Tripolyphosphate | 37.9 |
| $[Na_2O]SiO_2$ | 4.0 |
| Na LAS | 4.0 |
| Na AEOS | 13.0 |
| Tinopal AMS (brightener) | 0.21 |
| Water (moisture) | 5.5 |
| $Na_2SO_4$ | 20.8 |
| | 100.00% |

Although this particular detergent base is used, other anionic or nonionic based detergents could be utilized as well.

The active oxygen profiles were obtained in the following manner: The bleaching compositions were placed in 1,000 mL water at 21.7° C., at 100 ppm hardness (3/1 $Ca^{+2}/Mg^{+2}$), 1.5 mMol. $NaHCO_3$, with the detergent content at 1.287 g/L. The solution pH was adjusted to 10.5. The water was stirred at a rate so as to yield a 3 cm vortex, in a standard 2 liter beaker, and the amount of active oxygen (A.O.) from peracid generated was determined iodometrically.

The results are shown in TABLE IX below, which demonstrate the benefit of using a granulated activator over the powdered activator, which was claimed in the parent application, Ser. No. 06/928,070. The granulated activator disperses more rapidly than the powdered activator, thus yielding a higher active oxygen level over a longer period of time.

TABLE IX

| Perhydrolysis Profile of Granulated versus powdered Activator | | | |
|---|---|---|---|
| | % A.O. of theoretical @ various times (minutes) | | |
| Example | t = 2 | t = 6 | t = 12 |
| Granule[1] | 93 | 84 | 81 |
| Powder[2] | 45 | 71 | 82 |

[1]Granule was octanoyloxyacetate, phenol sulfonate ester, 90%, with linear $C_{11.5}$ alkylbenzene sulfonate, sodium salt, 10%.
[2]Powder was 100% octanoyloxyacetate, phenol sulfonate ester.

Storage stability of dry bleach compositions containing the activator were determined under the following conditions: The compositions were placed in open glass vials and stored in a storage room which maintained a constant temperature of about 32° C. and a relative humidity of about 85%. After storage, the samples were measured for their activator content by determining the yield of peracid A.O. in solution at six and twelve minutes.

The percent activator of various samples after storage are shown in TABLE X.

TABLE X

| Storage Stability in Open Glass Vials 32° C., 85% relative humidity | | | | |
|---|---|---|---|---|
| | % of original A.O. remaining Time in days | | | |
| Sample | t = 0 | t = 2 | t = 7 | t = 10 |
| Activator[1]/ LAS[2], 90/10 | 100 | 100 | 79 | 66 |
| Activator (Powder) | 100 | 76 | 9 | 5 |

[1]Octanoyloxyacetate, phenol sulfonate ester.
[2]linear $C_{11.5}$ alkyl benzene sulfonate.

The results in TABLE X show that granulated activator is significantly more storage stable than the powdered activator. After ten days storage, the granules exhibit a 44% A.O. loss, while the powder experiences about 95% A.O. loss.

In the test below, storage stability of the noodled/-granulated activator was compared against the powdered activator. The conditions were: 37° C., 70% relative humidity stored in an anionic (phosphate) base (see, e.g., the formulation of TABLE VI, above). The granules contained 90% nonanoyloxyacetate, phenol sulfonate ester; 5% $Na_2SO_4$, and 5% binder (LAS and Carbowax 8000, Caroowax 4600, Alfonic 1618–80, each at 50/50 wt./wt.).

TABLE XI

| | % A.O. yield of theoretical | | |
|---|---|---|---|
| Binder | t = 0 | t = 1 week | t = 2 weeks |
| Carbowax 8000/LAS[1] | 88% | 83% | 73% |
| Carbowax 4600/LAS[1] | 88% | 83% | 73% |
| Alfonic 1618-80/LAS[1] | 83% | 80% | 73% |
| Powdered Activator | 63% | 25% | 0% |

[1]LAS = Calsoft L40, Pilot Chemical Co.

Further tests were conducted comparing the granulated/noodled activator against the powdered activator, but this time, as a detergent composition. In this case, the activator evaluated was nonanoyloxyacetate, phenol sulfonate ester. The data were obtained in the presence of the detergent formulation of TABLE V above. 1.4 g of the detergent was added to 1,000 mL of water at 21° C. in a 2 liter beaker and stirred at a rate so as to yield a 3 cm vortex. The results are reported below, in TABLE XII.

TABLE XII

| Perhydrolysis Profile of Noodled Activator versus Powdered Activator | | | |
|---|---|---|---|
| | % A.O. of theoretical at various times (t) in days | | |
| Sample | t = 4 | t = 8 | t = 12 |
| Activator[1] | 88 | 88 | 78 |
| Activator[2] (Powder) | 62 | 66 | 56 |

[1]Nonanoyloxyacetate, phenol sulfonate ester, 90% (as produced), granulated with Calsoft L40, 2.5%, PEG 4600, 2.5%, sodium sulfate (filler), 5%.
[2]Nonanoyloxyacetate, phenol sulfonate ester, 100% (as produced).

Further experiments conducted tested the performance of particular surfactants in the detergent base with which the activator granules were combined. Surprisingly, Applicants discovered that performances of certain long chain linear alkyl benzene sulfonates demonstrably improved cleaning performance.

TABLE XIII

| | Chain length Distributions: | | | | | |
|---|---|---|---|---|---|---|
| | $C_{10}$ | $C_{11}$ | $C_{12}$ | $C_{13}$ | $C_{14}$ | Mol. Wt. |
| 1. Biosoft S130 | — | — | 17% | 50% | 28% | 340 |
| 2. Biosoft S100 | 20% | 43% | 32% | 4% | 1% | 316 |

A nonphosphate detergent having the formulation as in TABLE XIV below used surfactants 1 and 2 shown in TABLE XIII in the detergent base. These two examples were tested in wash water at about 21° C., 100 ppm hardness and the results reported in TABLE XV.

TABLE XIV

| Nonphosphate Detergent - Activator Formulation | |
|---|---|
| Component | Wt. % |
| $Na_2CO_3$ | 61.13 |
| HLAS | 11.34 |
| Na Perborate Monohydrate | 7.49 |
| Silicate | 6.48 |
| Activator Noodle | 9.97 |
| Minors, including $Na_2SO_4$ UMB, Enzyme, Moisture, etc. | 3.59 |
| | 100.00 |

The following performance data were thereby obtained:

TABLE XV

| Surfactant | Performance Comparison Soil/Fabric % Soil Removal (E) Sebum on Cotton | Sebum on Polyester | Sebum on Polycotton |
|---|---|---|---|
| Biosoft S130 | 71.9 | 92.6 | 81.6 |
| Biosoft S100 | 62.2 | 73.8 | 69.1 |
| $LSD_{(t\text{-}test)}$ (95% confidence) | 7.6 | 3.9 | 9.8 |
| | Average Scores For % S.R. on all Fabrics | | |
| Biosoft S130 | 82.0 | | |
| Biosoft S100 | 68.4 | | |
| $LSD_{(t\text{-}test)}$ (95% confidence) | 4.4 | | |

The above data demonstrate that selection of surfactant can have a significant effect on performance in detergent compositions containing the inventive activator granules. Thus, it has been shown that longer chain anionic surfactants are especially desirable for implementation in Applicants' detergent systems.

In another test, the effect on performance is reviewed when sodium perborate tetrahydrate is used as the oxidant, the surfactant chain length is varied, and the builder system is non-phosphate. The formulation in TABLE XIV, above, was used, with conditions of: perborate tetrahydrate crystals with particle size of U.S. Pat. No. mesh grade 30; 21° C., 100 ppm water hardness; and nonphosphate builder system (pH 10-10.5). The results are shown in TABLE XVI.

TABLE XVI

| Surfactant | % A.O. of peroxide yield at 12 minutes Perborate $4H_2O$[1] | Perborate $1H_2O$[2] |
|---|---|---|
| Biosoft S130 | 31% | 95% |
| Biosoft S100 | 91% | 95% |
| Neodol 25-9 | 95% | 95% |

[1]Sodium perborate tetrahydrate.
[2]Sodium perborate monohydrate.

The above results demonstrate that in a non-phosphate system, the chain length of the surfactant can influence solubility of the perborate tetrahydrate, when the surfactant is anionic. Further, the effect is not influenced by pH in the 9.8-11.0 range, water hardness (0-200ppm), and temperature below 32° C.

Because of this effect, it is preferred to use perborate monohydrate in a non-phosphate system which, as shown in TABLE XVI, is solubie.

In yet another test below, the solubility difference between the phosphate detergent formulation containing sodium perborate monohydrate in TABLE VI and an identical formulation containing sodium perborate tetrahydrate were compared The amount of particulate residue collected on a black swatch after filtering the wash solution therethrough indicates the degree of solubility of the respective formulations.

The procedure for determining detergent residue (meant to simulate scaled-down misuse conditions) is as follows: 10 g detergent is added to a 2 liter beaker containing 1,000 mL water at about 21° C. and stirred at a rate so as to yield a vortex of about 2-3 cm. After a time of ten minutes, the solution is filtered onto a black cloth (which has been previously weighed). The cloth and the undissolved particles are collected and dried. The dried cloth is then re-weighed to determine the amount of undissolved particles.

TABLE XVII

| Detergent Solubility Example | Residue (grams) |
|---|---|
| A[1] | 0.011 |
| B[2] | 0.293 |

[1]Detergent formula described in TABLE VI, above.
[2]Detergent formula listed in TABLE VI, with sodium perborate tetrahydrate substituted for sodium perborate monohydrate.

The above test results reported in TABLE XVII demonstrate that when the surfactant used is $C_{12\text{-}14}$ HLAS, in a non-phosphate system, it is preferred to use perborate monohydrate as the peroxide source in order to reduce residual undissolved particles.

The next experiments show the effect of heavy metal ions on solution stability of the in situ formed peracid from the inventive activator granules. Surprisingly, the use of an amino-polyphosphonate chelating agent reduced loss of peracid formed in solution when heavy metal cations were present. Tri(methylene phosphonic acid) amine (Dequest 2000 manufactured by Monsanto) was used as the chelating agent. Its effect on peracid decomposition in the presence of $Cu^{++}$ ion was measured by dissolving 4.5 g of the detergent composition shown in TABLE VI into three liters of water containing 100 ppm hardness (3:1 $Ca^{+2}$:$Mg^{+2}$ and the concentration of copper shown in Table XVIII. The composition contained nonanoyloxyacetate phenol sulfonate ester as a powder.

TABLE XVIII

| Example | Average ppm[1] of A.O. 4, 8, and 12 minutes Avg. ppm[1], A.O. | ppb[2] $Cu^{++}$ | ppm[1] Dequest 2000 |
|---|---|---|---|
| 1 | 2.7 | 0 | 0 |
| 2 | 2.0 | 50 | 0 |
| 3 | 1.3 | 100 | 0 |
| 4 | 0.9 | 250 | 0 |
| 5 | 2.6 | 250 | 10 |

[1]ppm = parts per million.
[2]ppb = parts per billion.

Table XVIII clearly demonstrates that heavy metal cations, e.g., copper ion, decompose the peracid formed from the activator and that a chelating agent (Dequest ® 2000) prevents this copper ion catalyzed decomposition.

The invention is further exemplified in the claims which follow. However, the invention is not limited thereby, and obvious embodiments and equivalents thereof are within the claimed invention.

We claim:

1. An activated oxidant detergent comprising:

a) bleach activator granules comprising:

i) a peroxygen bleach activator having the structure:

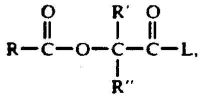

wherein R is $C_{1-20}$ branched or straight chain alkyl, cycloalkyl, alkenyl, aryl, alkylaryl; R' and R'' are independently H, $C_{1-4}$ alkyl; and L is a leaving group selected from the group consisting of:

(1) 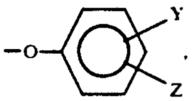

wherein Y and Z are individually H, $SO_3M$, $SO_4M$, OH, halo substituent, $OR^1$, $R^2$, $NR^3{}_3X$, and mixtures thereof, wherein M is an alkali metal or alkaline earth metal conunterion, $R^1$ of $OR^1$ is $C_{1-20}$ alkyl, $R^2$ is $C_{1-6}$ alkyl, $R^3$ of $NR^3{}_3$ is $C_{1-30}$ alkyl and X is a counterpart ion thereto, and Y and Z can be the same or different;

(2) halide;

—$ONR^4$, wherein $R^4$ contains at least one carbon which is singly or doubly bonded directly to N;

(3) 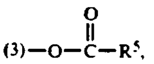

wherein $R^5$ is a $C_{1-10}$ alkyl; and (4) mixtures thereof;

ii) a pliable binding material selected from materials having a melting completion temperature of greater than about 40° C.; and, optionally, iii) a filler material;

b) a detergent base which comprises:

i) builders;

ii) fillers;

iii) a surfactant selected from the group consisting of anionic, nonionic, cationic, amphoteric, zwitterionic surfactants, and mixtures thereof; and c) a bleach-effective amount of a source of hydrogen peroxide, which acts in combination with the activator granules of a).

2. The activated oxidant detergent of claim 1 further comprising d) a detergent adjunct selected from the group consisting of enzymes, dyes, pigments, fluorescent whitening agents, anti-redeposition agents, antifoaming agents, buffers, fragrances, and mixtures thereof.

3. The activated oxidant detergent of claim 1 wherein said surfactant of b)iii) is a nonionic surfactant, an anionic surfactant, or a mixture thereof.

4. The activated oxidant detergent of claim 3 wherein said surfactant of b)iii) is an anionic surfactant selected from the group consisting of sulfonated aromatic surfactants.

5. The activated oxidant detergent of claim 4 wherein said surfactant is a $C_{6-18}$ linear alkylbenzene sulfonate.

6. The activated oxidant detergent of claim 5 wherein said surfactant is a $C_{12-14}$ linear alkylbenzene sulfonate.

7. The activated oxidant detergent of claim 1 further comprising a chelating agent.

8. The activated oxident detergent of claim 7 wherein said chelating agent is selected from aminopolyphosphonates, polyphosphonates, ethylenediaminetetraacetic acid, and mixtures thereof.

9. The activated oxidant detergent of claim 8 wherein said chelating agent is an aminopolyphosphonate.

* * * * *